US010282722B2

(12) United States Patent
Huang

(10) Patent No.: US 10,282,722 B2
(45) Date of Patent: May 7, 2019

(54) MACHINE LEARNING SYSTEM, METHOD, AND PROGRAM PRODUCT FOR POINT OF SALE SYSTEMS

(71) Applicant: Yi Sun Huang, Cupertino, CA (US)

(72) Inventor: Yi Sun Huang, Cupertino, CA (US)

( * ) Notice: Subject to any disclaimer, the term of this patent is extended or adjusted under 35 U.S.C. 154(b) by 56 days.

(21) Appl. No.: 15/146,043

(22) Filed: May 4, 2016

(65) Prior Publication Data

US 2016/0328660 A1 Nov. 10, 2016

Related U.S. Application Data

(60) Provisional application No. 62/156,848, filed on May 4, 2015.

(51) Int. Cl.
| | | |
|---|---|---|
| *G06N 3/04* | (2006.01) | |
| *G07G 1/00* | (2006.01) | |
| *G06F 17/30* | (2006.01) | |
| *G06N 99/00* | (2019.01) | |
| *G06Q 20/20* | (2012.01) | |

(52) U.S. Cl.
CPC ..... *G06Q 20/208* (2013.01); *G06F 17/30536* (2013.01); *G06N 3/0454* (2013.01); *G06N 99/005* (2013.01); *G07G 1/0045* (2013.01); *G06K 2209/17* (2013.01); *Y04S 10/54* (2013.01)

(58) Field of Classification Search
CPC .. G06Q 20/20; G06Q 20/206; G06K 2209/17; G07G 1/0063
USPC .................. 705/16, 20, 21, 23, 26.9; 706/12
See application file for complete search history.

(56) References Cited

U.S. PATENT DOCUMENTS

| 7,334,729 | B2 * | 2/2008 | Brewington | ........... G06Q 30/06 235/383 |
| 7,337,960 | B2 * | 3/2008 | Ostrowski | ............... A47F 11/10 235/383 |
| 8,571,298 | B2 * | 10/2013 | McQueen | ................ G06K 9/00 235/378 |
| 9,208,383 | B2 * | 12/2015 | Naito | ................. G06K 9/00624 |
| 9,245,424 | B2 * | 1/2016 | Ueda | ......................... G06K 9/00 |
| 9,454,708 | B2 * | 9/2016 | Miyakoshi | ............... G06K 9/46 |
| 9,792,635 | B2 * | 10/2017 | Sasaki | ................ G06Q 30/0609 |
| 2002/0138374 | A1 * | 9/2002 | Jennings | ................... G06K 9/00 705/29 |
| 2003/0028499 | A1 * | 2/2003 | Anderson | ................ G06K 9/62 706/20 |

(Continued)

FOREIGN PATENT DOCUMENTS

| JP | 2010237886 A | * | 10/2010 |
| JP | 2014160493 A | * | 9/2014 |

(Continued)

*Primary Examiner* — John Villecco
(74) *Attorney, Agent, or Firm* — Ariel S. Bentolila; Bay Area IP Group, LLC

(57) ABSTRACT

A method and program product includes scanning for at least one identification means of an object. An image of the object is captured. An identification associated with the image and the image are communicated to a training system. The training system is configured for at least training a neural network system with identifications and images to produce synaptic weights. Synaptic weights are received from the training system. A predicted identification from a captured image of an object is predicted. The predicting uses at least the synaptic weights.

13 Claims, 10 Drawing Sheets

(56) References Cited

U.S. PATENT DOCUMENTS

| | | | |
|---|---|---|---|
| 2004/0141641 A1* | 7/2004 | McDonald, Jr. | G06K 9/00127 382/159 |
| 2005/0189411 A1* | 9/2005 | Ostrowski | A47F 9/045 235/383 |
| 2006/0261938 A1* | 11/2006 | Lai | G06K 7/0008 340/505 |
| 2008/0082468 A1* | 4/2008 | Long | G06K 9/00147 706/12 |
| 2010/0002902 A1* | 1/2010 | Landers, Jr. | G06Q 20/202 382/100 |
| 2010/0086192 A1* | 4/2010 | Grigsby | G06F 17/30256 382/141 |
| 2010/0217678 A1* | 8/2010 | Goncalves | G06Q 20/203 705/22 |
| 2012/0243779 A1* | 9/2012 | Nakai | G06K 9/6256 382/159 |
| 2014/0036630 A1* | 2/2014 | Herwig | G07G 1/0054 367/87 |
| 2014/0143185 A1* | 5/2014 | Karan | G06N 3/049 706/12 |
| 2015/0054959 A1* | 2/2015 | He | G06K 9/00523 348/150 |
| 2015/0055855 A1* | 2/2015 | Rodriguez | G06F 21/16 382/159 |
| 2015/0109451 A1* | 4/2015 | Dhankhar | G06Q 30/0641 348/150 |
| 2015/0170001 A1* | 6/2015 | Rabinovich | G06K 9/66 382/110 |
| 2015/0254575 A1* | 9/2015 | Nere | G06N 99/005 706/12 |
| 2016/0187199 A1* | 6/2016 | Brunk | G01J 3/2823 348/89 |
| 2016/0314450 A1* | 10/2016 | Kakino | G06K 9/00993 |
| 2017/0185985 A1* | 6/2017 | Harada | G06Q 20/208 |
| 2017/0243317 A1* | 8/2017 | Rodriguez | G06T 1/0021 |

FOREIGN PATENT DOCUMENTS

| | | | |
|---|---|---|---|
| JP | 2015035094 A | * | 2/2015 |
| JP | 2015064628 A | * | 4/2015 |

* cited by examiner

MACHINE LEARNING SYSTEM, METHOD, AND PROGRAM PRODUCT FOR POINT OF SALE SYSTEMS

CROSS-REFERENCE TO RELATED APPLICATIONS

The present Utility patent application claims priority benefit of the U.S. provisional application for patent Ser. No. 62/156,848 entitled "MACHINE LEARNING SYSTEM ON RETAIL SHOPPING" filed 4 May 2015 under 35 U.S.C. 119(e). The contents of this related provisional application are incorporated herein by reference for all purposes to the extent that such subject matter is not inconsistent herewith or limiting hereof.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to machine learning systems. More particularly, certain embodiments of the invention relates to machine learning systems in point of sale systems.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. In a traditional way, retail stores may either label each item with barcode or quick response (QR) code. Sometimes, they may need cashiers to remember an ID of each item or non-labeled items. The ID could be a few letters, digits or combination of letters and digits. The barcode, QR code or ID may be used for connecting to a database to get the price of that item. A point-of-sale (POS) is a place where a retail transaction may be completed. It is the place that a customer makes a payment to the merchant in exchange for goods. At the point of sale, the retailer may calculate the total amount customer needs to pay and provide options for the customer to make a payment. The merchant may also normally issue a receipt for the transaction. There are various POS systems for different retail industries uses. Different retail industries may use their customized hardware and software according to their requirements. Many retailers may use weighing scales, scanners, electronic and manual cash registers, terminals, touch screens and any other wide variety of hardware and software available for us with POS. For example, a grocery store may use a scale at the point of sale, while restaurants may use software to customize service sold when a customer requests for a meal or drink. The point of sale may also be referred to as a point of service. It is because it is not just a point of sale, but also a point of return or customer order. The POS system has many features such as inventory management, CRM, financials and warehousing, etc.

By way of educational background, another aspect of the prior art generally useful to be aware of is a cloud-based POS is a system deployed as software as a service, which may be accessed directly from the Internet by using an internet browser. Cloud-based POS systems may be independent from platform and operating system limitations. It may also be designed to be compatible with a wide range of POS hardware and sometimes compatible with mobile devices. Cloud-based POS systems may store data, and inventory in a remote server. The cloud-based POS system may not run locally, so there may be no installation required in the local store.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
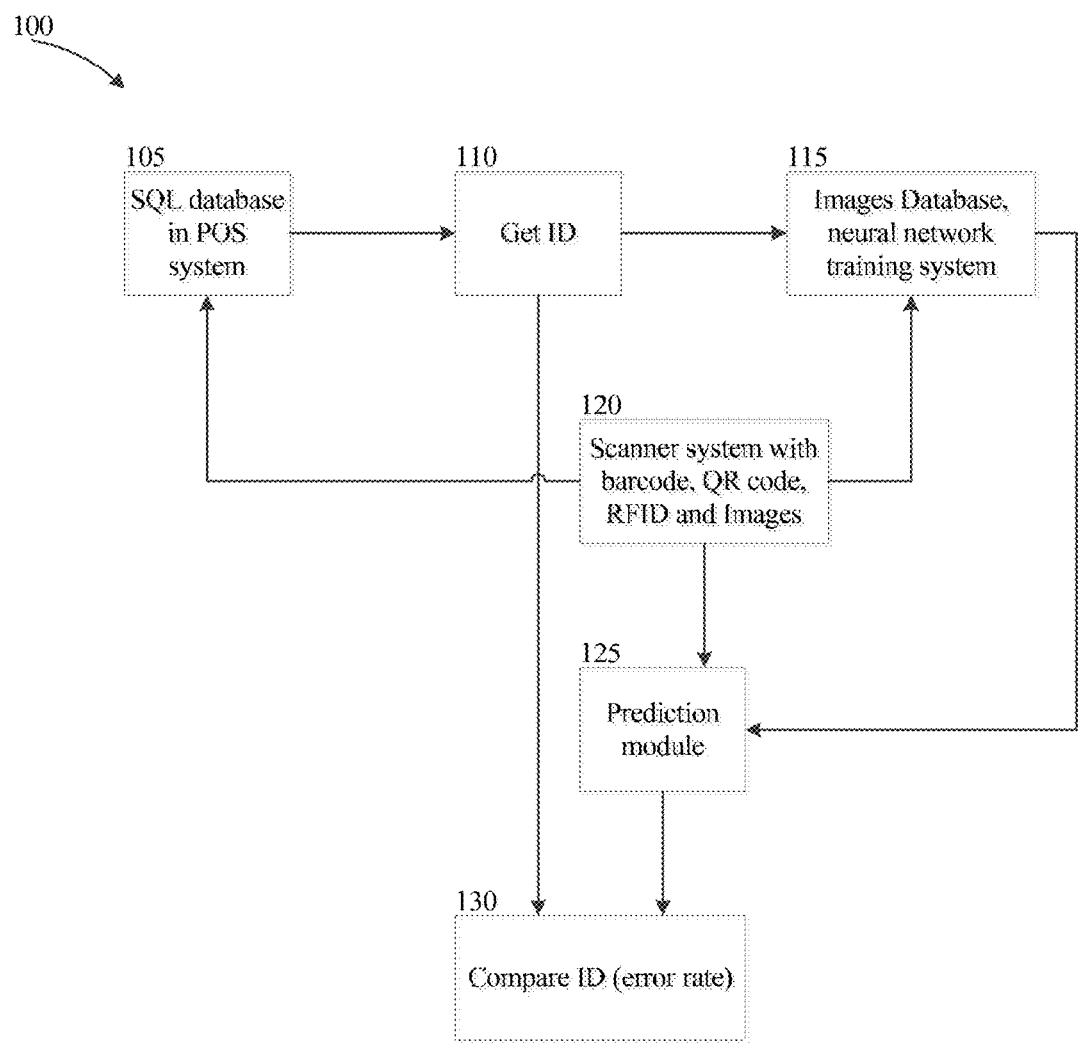
FIG. 1 illustrates an exemplary flow diagram for machine learning, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settle law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See *Energy Absorption Sys., Inc.* v. *Roadway Safety Servs., Inc.*, Civ. App. 96-1264, slip op. at 10 (Fed. Cir. Jul. 3, 1997) (unpublished) *Hybridtech* v. *Monoclonal Antibodies, Inc.*, 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See *Seattle Box Co.* v. *Industrial Crating&Packing, Inc.*, 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. *Deering Precision Instruments, L.L.C.* v. *Vector Distribution Sys., Inc.*, 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See *Dana Corp.* v. i American Axle&*Manufacturing, Inc.*, Civ. App. 04-1116, 2004 U.S. App. LEXIS 18265, *13-14 (Fed. Cir. Aug. 27, 2004) (unpublished). The term "substantially" is commonly used by claim drafters to indicate approximation. See *Cordis Corp.* v. *Medtronic AVE Inc.*, 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also *Deering Precision Instruments, LLC* v. *Vector Distribution Sys., Inc.*, 347 F.3d 1314, 1322 (Fed. Cir. 2003); *Epcon Gas Sys., Inc.* v. *Bauer Compressors, Inc.*, 279 F.3d 1022, 1031 (Fed. Cir. 2002). We find that the term "substantially" was used in just such a manner in the claims of the patents-insuit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, *Liquid Dynamics Corp.* v. *Vaughan Co.*, 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." *In Cordis Corp.* v. *Medtronic AVE, Inc.*, 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In *Anchor Wall Systems* v. *Rockwood Retaining Walls, Inc.*, 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, *L.L.C.* v. *Vector Distrib. Sys., Inc.*, 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., *Epcon Gas Sys., Inc.* v. *Bauer Compressors, Inc.*, 279 F.3d 1022 (Fed. Cir. 2002) (construing the terms "substantially constant" and "substantially below"); *Zodiac Pool Care, Inc.* v. *Hoffinger Indus., Inc.*, 206 F.3d 1408 (Fed. Cir. 2000) (construing the term "substantially inward"); *York Prods., Inc.* v. *Cent. Tractor Farm&Family Ctr.*, 99 F.3d 1568 (Fed. Cir. 1996) (construing the term "substantially the entire height thereof"); *Tex. Instruments Inc.* v. *Cypress Semiconductor Corp.*, 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see *AK Steel Corp.* v. *Sollac*, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by *Pall Corp.* v. *Micron Separations, Inc.*, 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see *Verve LLC* v. *Crane Cams Inc.*, 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In *Andrew Corp.* v. *Gabriel Elecs. Inc.*, 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in *Ecolab Inc.* v. *Envirochem, Inc.*, 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see *Ecolab Inc.* v. *Envirochem Inc.*, 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter.", e.g., see *Pall Corp.* v. *Micron Seps.*, 66 F.3d 1211, 1217, 36 USPQ2d 1225, 1229 (Fed. Cir. 1995); see, e.g., Andrew Corp. v. Gabriel Elecs. Inc., 847 F.3d 819, 821-22, 6 USPQ2d 2010, 2013 (Fed. Cir. 1988) (noting that terms such as "approach each other,"

"close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks "Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of" and "consisting essentially of" where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

Many embodiments, and variations thereof, may provide for machine learning methods and means for learning from, but not limited to, tags, barcodes, human entering IDs, QR codes, radio-frequency identification (RFID)s, etc. In some embodiments, a machine learning system may identify an item associated with a database. The machine learning system may classify the item by obtaining an image or images from, without limitation, a camera. The system may classify the item to match a database by, but not limited to, ID, barcode or QR code etc.

Some embodiments, may be implemented in a component such as, but not limited to, a smart device with a scanner and a camera capability. Through a network connection, the smart device may send barcode and associated images to a cloud computing system. The cloud computing system may train a neural network or machine learning database. In some embodiments, the smart device may be incorporated in a robotic like device. Some embodiments may be implemented for recognizing an ID of a customer.

In some embodiments, a POS system may include, without limitation, a scanner component, which may scan, but not limited to, barcodes, QR codes, RFIDs, IDs, etc., a camera component, which may capture one or more images of objects, and a computing component with a prediction algorithm to classify the object. In some embodiments, the POS system may include one or more database for, but not limited to, a point of sale, a point of return or customer order, aisle number and map of items, inventory management, customer relationship management (CRM), financials and warehousing, etc. In some embodiments, the POS system may include a training database in a server system for training a neural network or artificial intelligence algorithm. In some embodiments, the POS system may include a database for storing a POS database for such as, but not limited to, calculating total price, making a payment in exchange for goods, issuing a receipt for the transaction, inventory management, CRM, financials and warehousing, etc. In some embodiments, the POS system may include an image database for, but not limited to, supervised training. In some embodiments, the POS system may include a database for storing aisle number and floor map of items. In some embodiments, the POS system may function to display the aisle number and floor map of searched items. In some embodiments, the POS system may function to compare an aisle number and floor maps of an object to a database to see whether it is misplaced or not.

Some embodiments may be incorporated with a surveillance system. In some embodiments, the surveillance system may incorporate supervised learning. In some embodiments, the surveillance system may incorporate unsupervised learning. In some embodiments, the surveillance system may include, but not limited to: one or more devices that may include, but not limited to, a camera unit for capturing images, and a computing unit for capturing images/videos to identify names of the people; a server system for training on images/video and uploading neural weights to the one or more devices; and a network for linking the devices and the server system. In some embodiments, the surveillance system may find a similarity of a certain signature or image and report the location.

FIG. 1 illustrates an exemplary flow diagram for machine learning, in accordance with an embodiment of the present invention. In the present embodiment, a system 100 such as, without limitation, a POS system, may have a scanner system 120 for scanning identification means of an item or object such as, but not limited to, tags, barcodes, QR codes, RFIDs, etc. Scanner system 120 may also include an imaging device such as, but not limited to, a camera for capturing one or more images of the item. The scanned identification may be used to obtain an ID 110 for the object from a database 105. The ID for the item and the captured images may then be transferred to training system 115. The images associated with the ID may be stored into an images database. In some embodiments, a supervised training method may be used to train a neural network system. After, the training system 115 obtains enough images for each classification items and runs enough epochs (iterations) for the training. As a non-limiting example, this process may take hours or days. Later, the training system 115 may send trained synaptic weights to prediction module 125 to predict the classification of new objects. An error rate 130 may be determined from comparing the ID 110 from identification means and ID from prediction module 125. When the error rate is at an acceptable level, the prediction module 125 may be used to classify objects instead of scanning identification means to identify the object.

Figure 2:
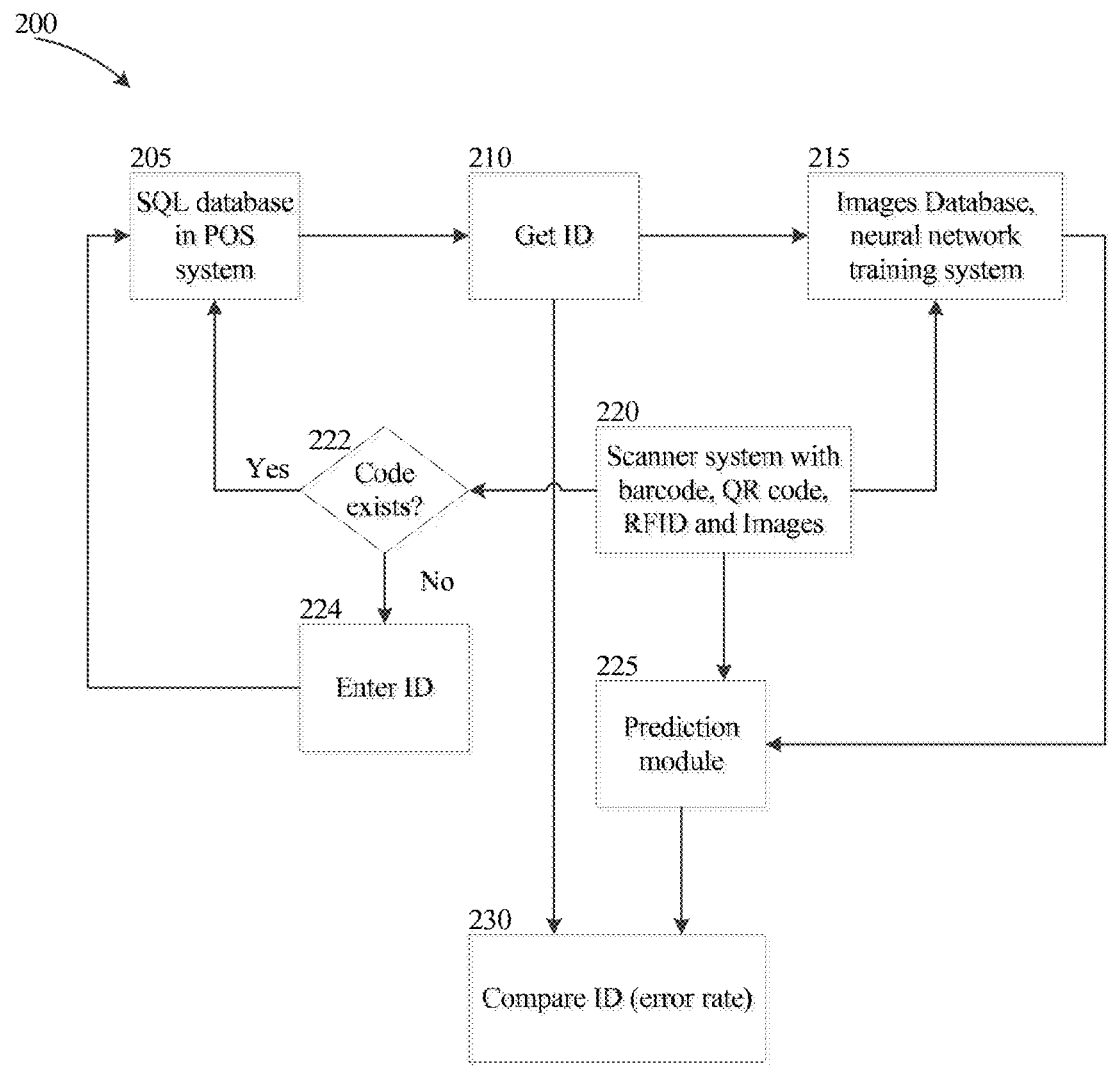
FIG. 2 illustrates an exemplary flow diagram for machine learning with key entry, in accordance with an embodiment of the present invention.

FIG. 2 illustrates an exemplary flow diagram for machine learning with key entry, in accordance with an embodiment of the present invention. In the present embodiment, a system 200 such as, without limitation, a POS system, may have a scanner system 220 for scanning identification means of an item or object such as, but not limited to, tags, barcodes, QR codes, RFIDs, etc. Scanner system 220 may also include an imaging device such as, but not limited to, a camera for capturing one or more images of the item. If the scanner system 220 obtained an identification 222, the scanned identification may be used to obtain an ID 210 for the object from a database 205. If the scanner system 220 did not obtained an identification 222, a manual entry 224 may be used to obtain an ID 210 for the object from a database 205. The ID for the item and the captured images may then be transferred to training system 215. The images associated with the ID may be stored into an images database. In some embodiments, a supervised training method may be used to train a neural network system. After, the training system 215 obtains enough images for each classification items and runs enough epochs for the training. As a non-limiting example, this process may take hours or days. Later, the training system 215 may send trained synaptic weights to prediction module 225 to predict the classification of new objects. An error rate 230 may be determined from comparing the ID 210 from identification means and ID from prediction module 225. When the error rate is at an acceptable level, the prediction module 225 may be used to classify objects instead of scanning identification means to identify the object.

In some embodiments, a supervised learning problem may have access to labeled training examples (x(i), y(i)) where x is an input image and y is a classification ID. A training model may use a softmax regression model (or multinomial logistic regression). A fixed training set may be: $\{(x^{(1)},y^{(1)}), \ldots, (x^{(m)},y^{(m)})\}$ of m labeled examples where the input features are:

$x^{(i)} \in \Re^{n+1}$.

The present example may use a notational convention of letting the feature vectors x be n+1 dimensional, with x0=1 corresponding to the intercept term. With logistic regression in the binary classification setting, the labels may be:

$y^{(i)} \in \{0,1\}$

A hypothesis may take the form:

$$h_\theta(x) = \frac{1}{1 + \exp(-\theta^T x)},$$

Given a training set of m examples, an overall cost function may be defined to be the model parameters θ were trained to minimize the cost function:

$$J(\theta) = -\frac{1}{m} \left[ \sum_{i=1}^{m} y^{(i)} \log h_\theta(x^{(i)}) + (1 - y^{(i)}) \log(1 - h_\theta(x^{(i)})) \right]$$

One iteration of batch gradient descent may be implemented as follows:

$$\nabla_{\theta_j} J(\theta) = -\frac{1}{m} \sum_{i=1}^{m} [x^{(i)}(1\{y^{(i)} = j\} - p(y^{(i)} = j \mid x^{(i)}; \theta))]$$

The cost function may be modified by adding a weight decay term:

$$\frac{\lambda}{2} \sum_{i=1}^{k} \sum_{j=0}^{n} \theta_{ij}^2$$

which may penalize large values of the parameters. The cost function is now:

$$J\theta = -\frac{1}{m} \left[ \sum_{i=1}^{m} \sum_{j=1}^{k} 1\{y^{(i)} = j\} \log \frac{e^{\theta_j^T x^{(i)}}}{\sum_{l=1}^{k} e^{\theta_l^T x^{(i)}}} \right] + \frac{\lambda}{2} \sum_{i=1}^{k} \sum_{j=0}^{n} \theta_{ij}^2$$

With this weight decay term (for any λ>0), the cost function J(θ) may be now strictly convex, and may be guaranteed to have a unique solution. The Hessian is now invertible, and because J(θ) is convex, algorithms such as gradient descent, L-BFGS, etc. are guaranteed to converge to the global minimum.

To apply an optimization algorithm, a derivative of this new definition of J(θ) may be needed. One may show that the derivative is:

$$\nabla_{\theta_j} J(\theta) = -\frac{1}{m} \sum_{i=1}^{m} [x^{(i)}(1\{y^{(i)} = j\} - p(y^{(i)} = j \mid x^{(i)}; \theta))] + \lambda \theta_j$$

By minimizing J(θ) with respect to θ, one may have a working implementation of softmax regression.

To train the neural network, one may now repeatedly take iterations of gradient descent to reduce the cost function J(θ). After training process, one may reduce the value of cost function after running back propagation for many Enter ID (iterations). When the error rate achieves to an acceptable level, the system may store the neural weights for prediction process.

By using the neural weights in the prediction process, one may predict objects in prediction module 125 or 225. In a non-limiting example, prediction module 125 or 225 may predict it is a gala apple and a kind of apple. Each kind of apple may have an object ID number associated with price, the POS system may calculate the weight and the price.

Figure 3:
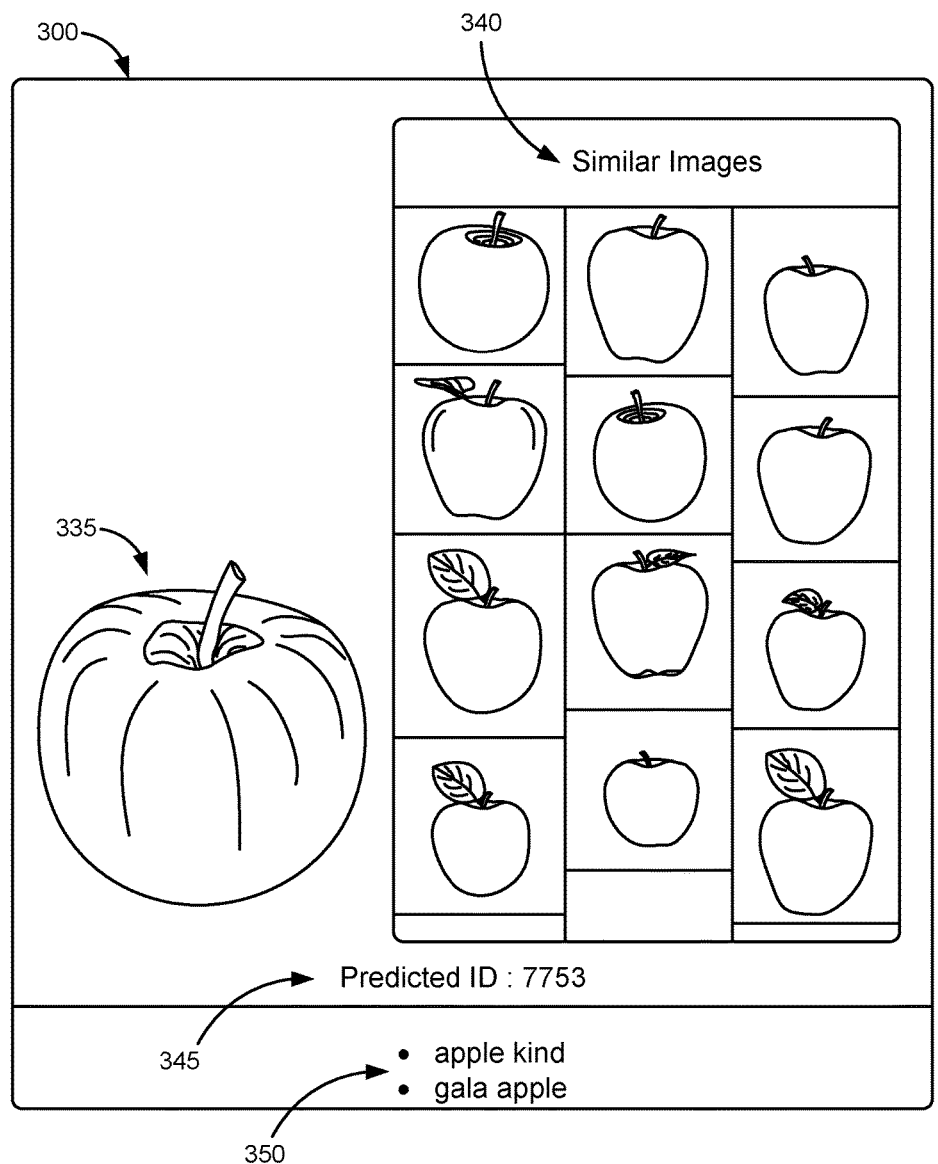
FIG. 3 illustrates an exemplary prediction, in accordance with an embodiment of the present invention.

FIG. 3 illustrates an exemplary prediction, in accordance with an embodiment of the present invention. In the present prediction example 300, a captured image 335 may be predicted by prediction module 125 or 225 and may predict it is a gala apple and a kind of apple 350. Similar images 340 may be stored in training system 115 or 215. Each kind of apple may have an object ID number 345 associated with price, the POS system may calculate the weight and the price.

Figure 4:
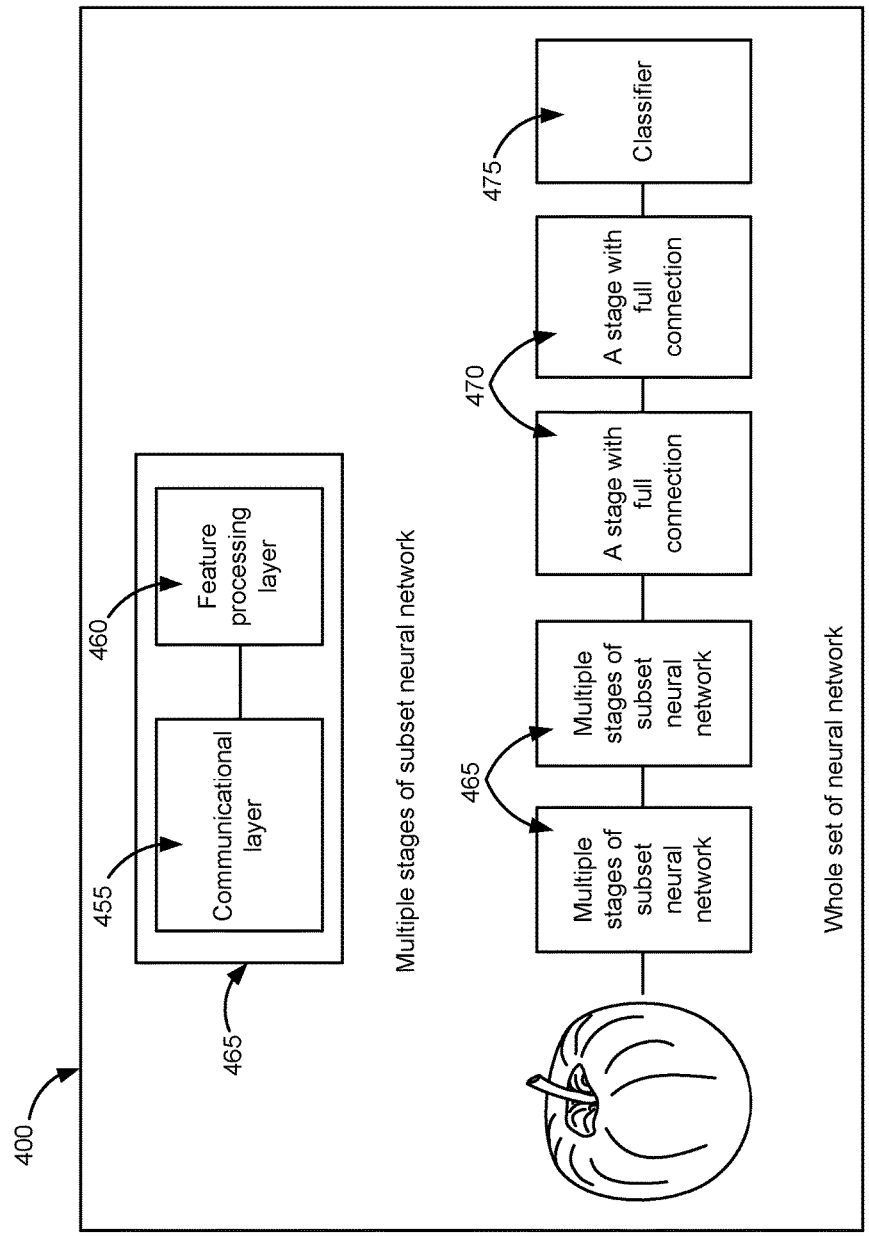
FIG. 4 illustrates an exemplary neural network architecture, in accordance with an embodiment of the present invention.

FIG. 4 illustrates an exemplary neural network architecture, in accordance with an embodiment of the present invention. A neural network 400 may include a plurality of multiple stages of subset neural layers 465, a plurality of stages of fully connected layers 470, and a final stage of a classifier layer 475. Subset neural network 465 may have a convolutional layer 455 and a pooling layer 460. Convolutional layer 455 may compute a forward pass and a back-propagation pass, and may have trainable filters and one trainable bias per feature map. A hyperbolic tangent or rectified function may be applied to activations in this layer. In convolutional layers 455, each map may be connected to all of its preceding feature maps. The purpose of pooling layers 460 may be to achieve spatial invariance by reducing a resolution of the feature maps. Each pooled feature map may correspond to one feature map of the previous layer. The unit of the pooling layer may be an n x n patch size window. The pooling window may be of arbitrary size, and windows may be overlapping.

One may evaluate two different pooling operations: max pooling and subsampling.

The subsampling function:

$$a_j = \tanh\left(\beta \sum_{N \times N} a_i^{n \times n} + b\right)$$

takes the average over the inputs, multiplies it with a trainable scalar, adds a trainable bias b, and passes the result through the non-linearity. The max pooling function:

$$a_j = \max_{N \times N}(a_i^{n \times n} u(n, n))$$

applies a window function u(x; y) to the input patch, and computes the maximum in the neighborhood. In both cases, the result may be a feature map of lower resolution.

The training may use the forward propagation and back-propagation algorithm. For error propagation and weight adaption in convolutional layers 455, pooling layers 460, fully connected layers 470, and classifier layer 475 may use a standard procedure of neural networks. After training neural network 400 with the image database, the system may calculate proper weights which may be used to classify the objects.

In some embodiments, the machine learning system may link with store layouts with aisles number, and may cooperate with a mobile robot such as, without limitation, having wheels or legs with camera to navigate aisle by aisle. In the present embodiment, the machine learning system may map items with the layout of the store. In some embodiments, using the map of items, a navigation system may help shoppers find what they want. In some embodiments, the system may be be able to display aisle numbers and floor map for searched items. In some embodiments, the robot with deep learning or machine learning algorithm may identify the misplaced items. In some embodiments, the robot may either put the misplaced items to the right place, or report a record of misplaced items and locations. In some alternate embodiments, the machine learning system may be used in warehouse systems.

In some embodiments, the machine learning system may be utilized to recognize a name of a customer. Some store cards may have at least one, barcode, QR code magnetic strip, or credit card number associated with personal name. As a non-limiting example, whenever the customer may enter the store the system may scan the store card and capture images of the customer. The system may send (image, id) as a pair to a database. Later, the system may have enough data to train a neural network to recognize the ID of the image. The system may use the ID to look up the name in the store-card's database to recognize the name of the customer from an image.

Figure 5:
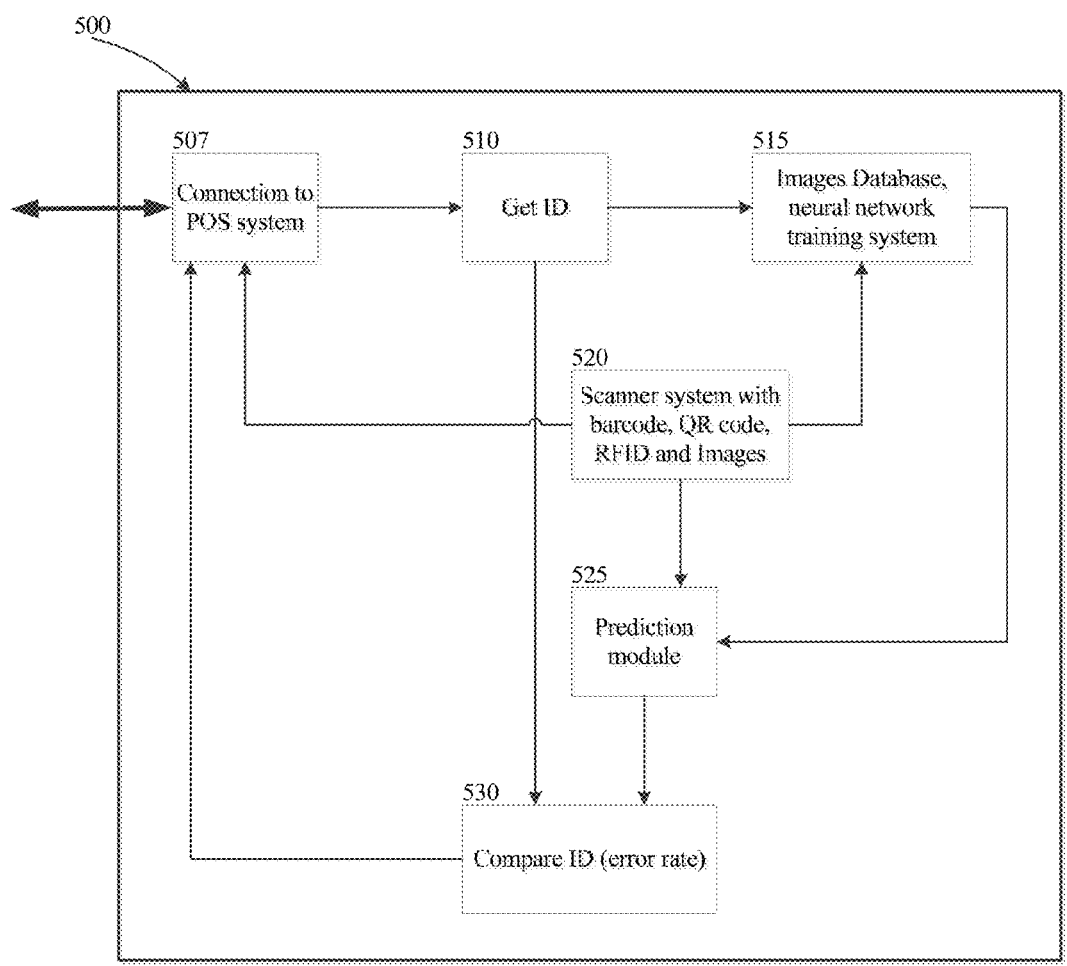
FIG. 5 illustrates an exemplary integrated machine learning system, in accordance with an embodiment of the present invention.

FIG. 5 illustrates an exemplary integrated machine learning system, in accordance with an embodiment of the present invention. In the present embodiment, an integrated system 500 such as, without limitation, a smart device, may have a scanner system 520 for scanning identification means of an item or object such as, but not limited to, tags, barcodes, QR codes, RFIDs, etc. Scanner system 520 may also include an imaging device such as, but not limited to, a camera for capturing one or more images of the item. The scanned identification may be used to obtain an ID 510 for the object from a database such as, without limitation, a POS database using a network connection 507. The ID for the item and the captured images may then be transferred to training system 515. The images associated with the ID may be stored into an images database. Training system 515 may send trained synaptic weights to prediction module 525 to predict the classification of new objects. An error rate 530 may be determined from comparing the ID 510 from identification means and ID from prediction module 525. When the error rate is at an acceptable level, the prediction module 525 may be used to classify objects instead of scanning identification means to identify the object and send the identification to the POS system using network connection 507.

Figure 6:
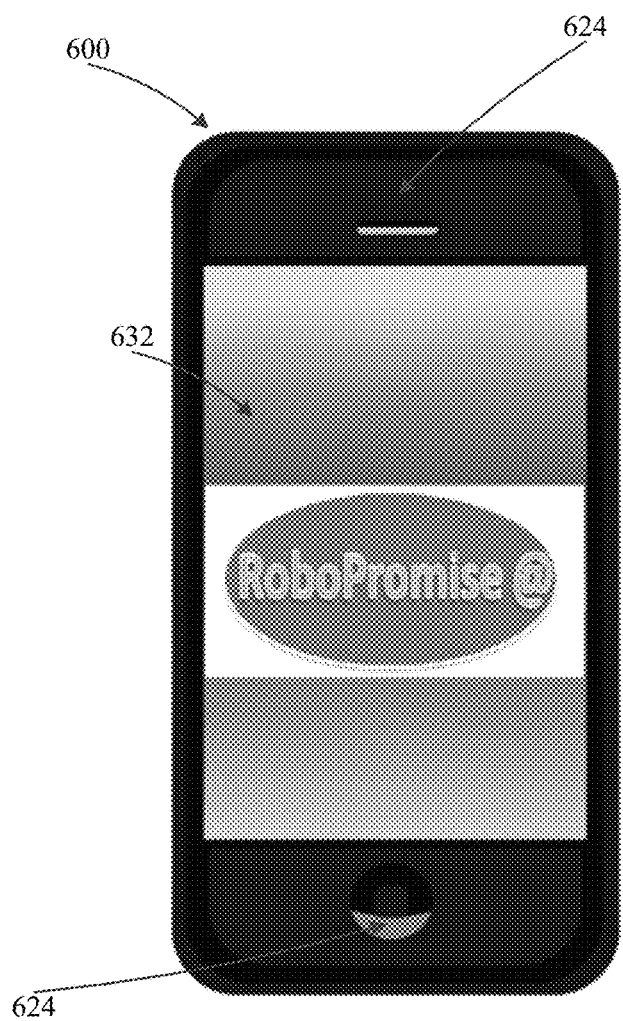
FIG. 6 illustrates an exemplary device with scanner and camera capability, in accordance with an embodiment of the present invention.

FIG. 6 illustrates an exemplary device with scanner and camera capability, in accordance with an embodiment of the present invention. In the present embodiment, device 600 such as, without limitation, a smart device, may have a display 632 and sensors 624 for scanning identification means of an item or object such as, but not limited to, tags, barcodes, QR codes, RFIDs, etc., and an imaging device such as, but not limited to, a camera for capturing one or more images of the item. Device 600 may communicate with a server system, such as, without limitation, a cloud computing system. In operation, device 600 may send the cloud computing system for example, without limitation, IDs and associated images to the cloud computing system. The cloud computing system may train a neural network or machine learning database for recognition capability by using a supervision training algorithm. After training, the cloud computing system sends back neural weights to device 600 for object recognition. In some embodiments, the machine learning system may link with store layouts or maps with aisles number, and may cooperate with a mobile robot such as, without limitation, having wheels or legs with camera to navigate aisle by aisle. In a non-limiting example, the robot may move around and capture 2D or 3D map and environment. With the function to recognize the IDs of goods and to calculate the aisle location and map, device 600 may compare to the aisle map in the store's database whether it is in the right location or not.

Figure 7:
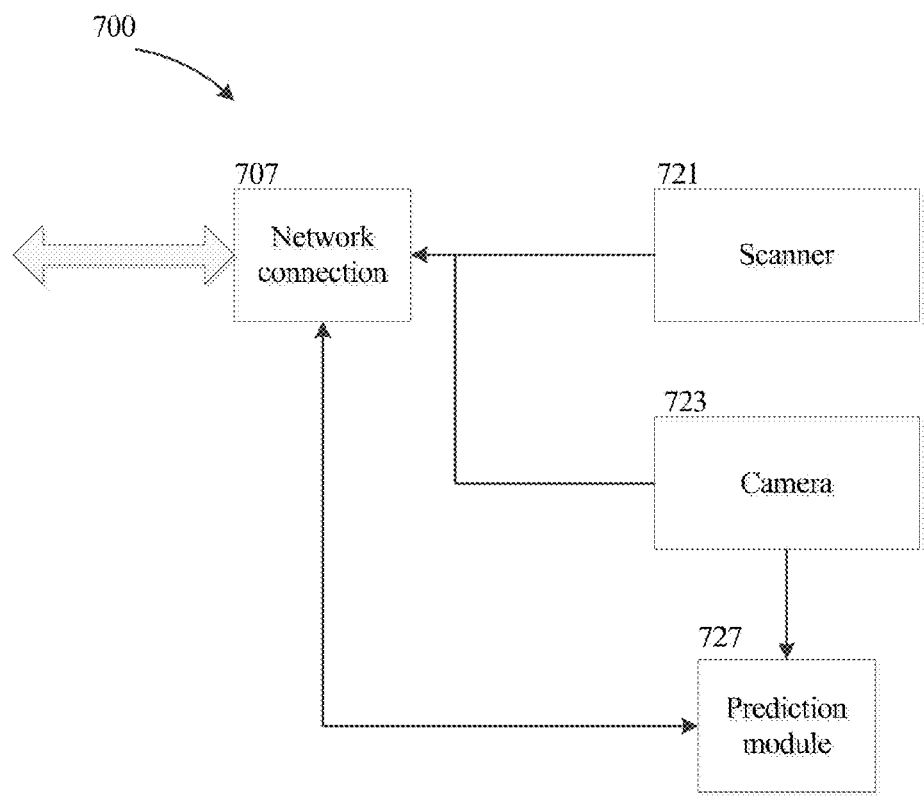
FIG. 7 illustrates an exemplary block diagram of a device with scanner and camera capability, in accordance with an embodiment of the present invention.

FIG. 7 illustrates an exemplary block diagram of a device with scanner and camera capability, in accordance with an embodiment of the present invention. In the present embodiment, device 700 such as, without limitation, a smart device, may have a network connection 707, a scanner 721 for scanning identification means of an item or object such as, but not limited to, tags, barcodes, QR codes, RFIDs, etc., an imaging device 723 such as, but not limited to, a camera for capturing one or more images of the item, and a prediction module 727. Device 700 may communicate with a server system, such as, without limitation, a cloud computing system. In operation, device 700 may send the cloud computing system for example, without limitation, IDs and associated images to the cloud computing system. The cloud computing system may train a neural network or machine learning database for recognition capability by using a supervision training algorithm. After training, the cloud computing system sends back neural weights to prediction module 727 for object recognition.

Figure 8:
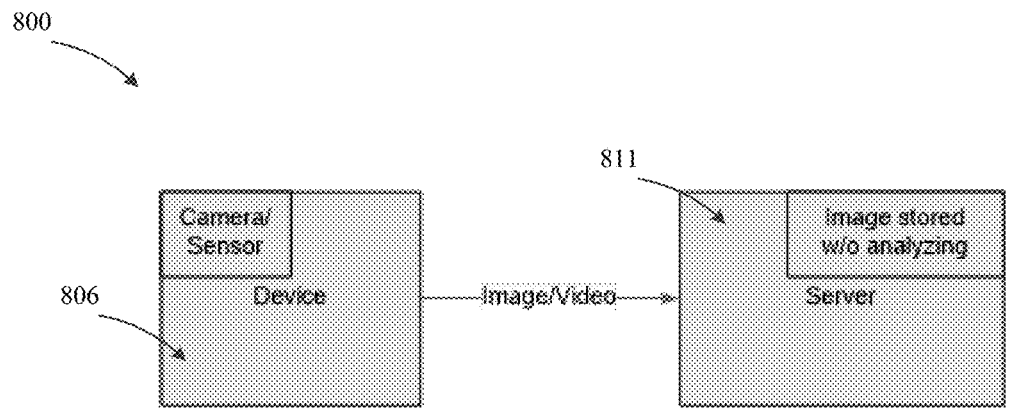
FIG. 8 illustrates an exemplary block diagram of a surveillance system, in the prior art.

FIG. 8 illustrates an exemplary block diagram of a surveillance system, in the prior art. Typically, traditional surveillance systems 800 may use a device 806 to capture images with or without motion detection. Those images may be uploaded to a network server 811 for later analysis by a machine or a human.

Figure 9:
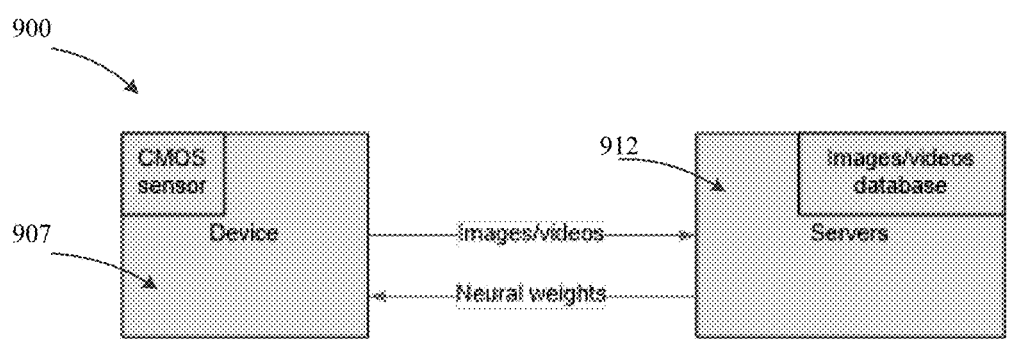
FIG. 9 illustrates an exemplary block diagram of a surveillance system, in accordance with an embodiment of the present invention.

FIG. 9 illustrates an exemplary block diagram of a surveillance system, in accordance with an embodiment of the present invention. In the present embodiment, system 900 may include a device 907 to capture images within a surveilled area. Captured images may be sent to a network server system 912. The present embodiment may learn how to classify an object by using a plurality of images from an existing database or capturing images from cameras. Neural weights may be learned from server system 912. System 912 may upload the neural weights to device 907. Then device 907 may classify the objects by using parameters that may be calculated by using neural weights. If device 907 cannot classify an object with higher score, device 907 may ask for instructions from a human or any other help. After giving instruction or help, device 907 may do a small learning in device or send to server 912. If device 907 sends the images with a low probability to server 912, then server 912 may try to learn from the images/video again and update the neural weights to device 907. Thus, the system may increase the accuracy.

Some embodiments may use a supervised learning. As a non-limiting example, the system 900 may provide labeled personal images in a company. The neural network may be trained to classify names of people by using a tagged/labeled database. Company security may check who is in front of camera.

Some embodiments may use an unsupervised training where people may be identified thru unsupervised learning. In some embodiments, the learning may run on device 907. In some embodiments, images may be uploaded to server 912 for unsupervised learning. Because of non-labeled images, device 907 or server 912 may just classify to different people without the proper name. As a non-limiting example, images may be classified into people-0, people-1, etc. In some embodiments, names may also be registered to put names on after the device has classified to people-0 or people-1, etc.

Figure 10:
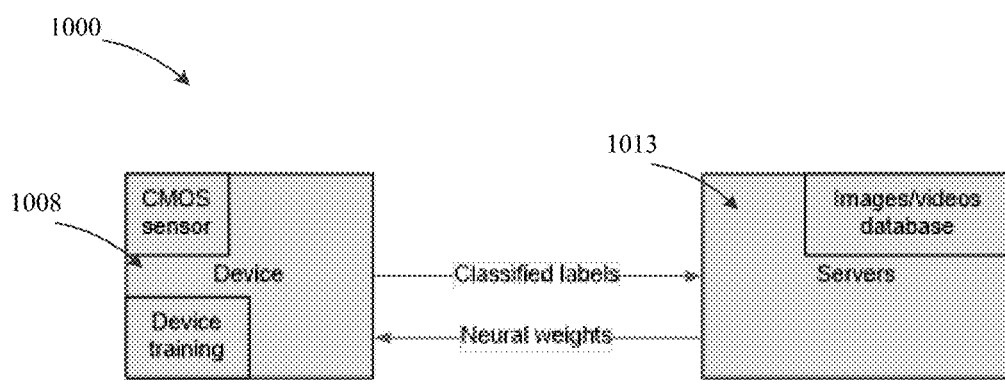
FIG. 10 illustrates an exemplary block diagram of a surveillance system, in accordance with an embodiment of the present invention.

FIG. 10 illustrates an exemplary block diagram of a surveillance system, in accordance with an embodiment of the present invention. In the present embodiment, system 1000 may include a device 1008 to capture images within a surveilled area. Device 1008 may do a partial training. Classified labels may be sent to a network server system 1013 to reduce communication bandwidth.

Figure 11:
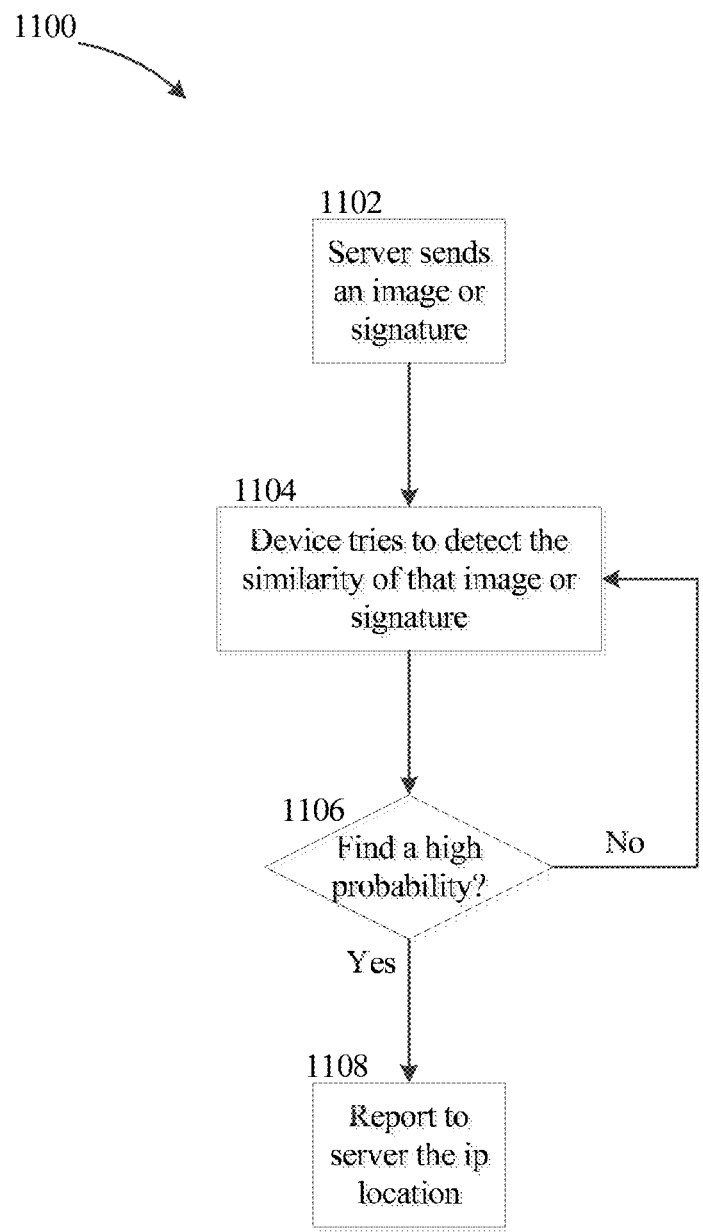
FIG. 11 illustrates an exemplary method for a search, in accordance with an embodiment of the present invention.

FIG. 11 illustrates an exemplary method for a search, in accordance with an embodiment of the present invention. Referring to FIG. 9 or FIG. 10, in the present embodiment, a search for, but not limited to, an image or a signature may begin at a step 1102 where network server system 912 or 1013 may send to device 907 or 1008 the image or signature for the search. In a step 1100 device 907 or 1008 may attempt to detect a similarity of the image or signature in a captured image or signature. In a step 1106, if device 907 or 1008 may not find a high probability of detection the process may return to step 1104. If device 907 or 1008 may find a high probability of detection, device 907 or 1008 may report their network location to network server system 912 or 1013. In a non-limiting example, to find a person named "Peter" the system may upload a picture or signature of "Peter" from network server system 912 or 1013 to device 907 or 1008, then the system may ask device 907 or 1008 to find "Peter". Once the device 907 or 1008 finds "Peter", the device 907 or 1008 may send a message to network server system 912 or 1013. Network server system 912 or 1013 may know which device and location of the device. The system may identify the location of "Peter".

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Figure 12:
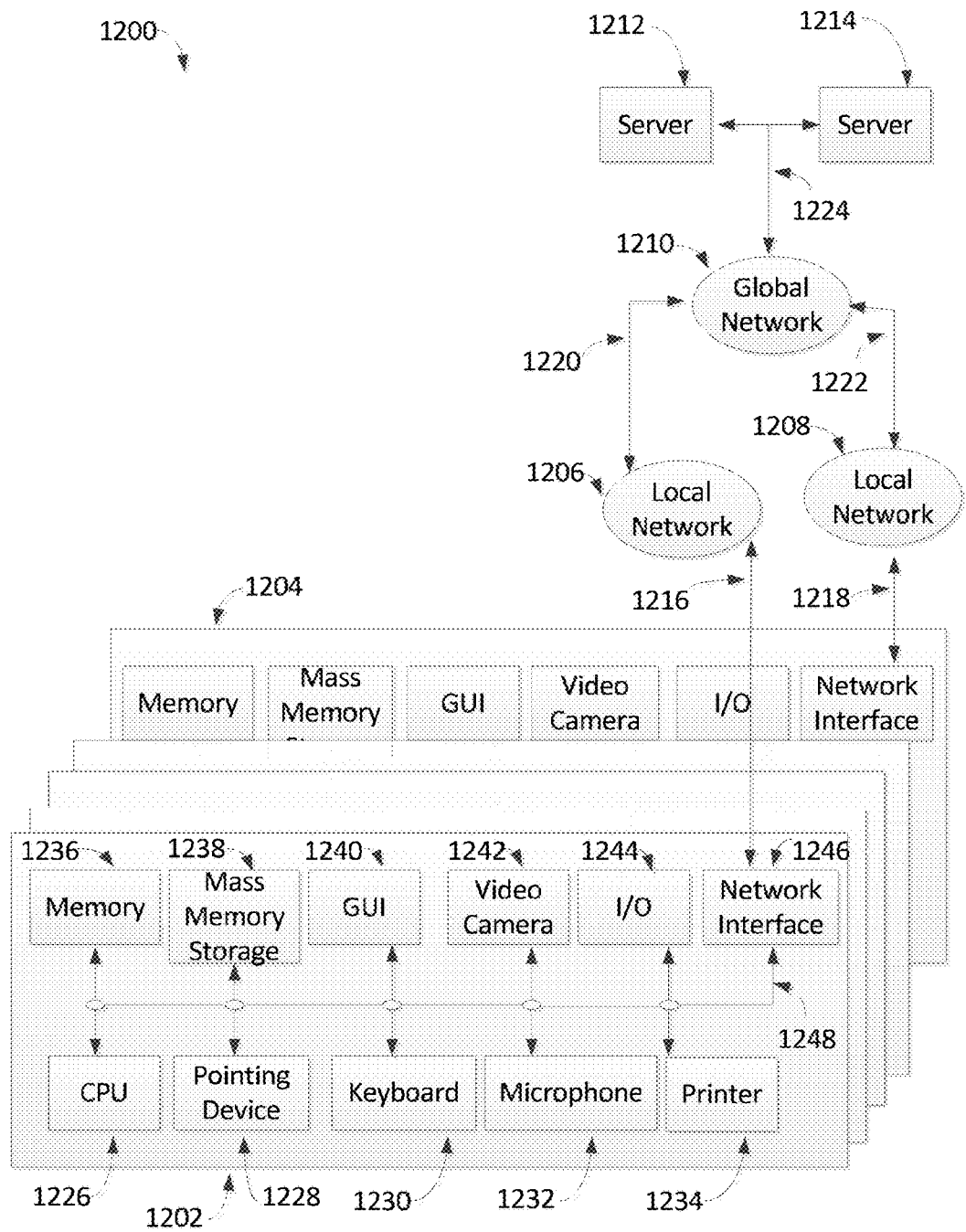
FIG. 12 is a block diagram depicting an exemplary client/server system which may be used by an exemplary web-enabled/networked embodiment of the present invention.

FIG. 12 is a block diagram depicting an exemplary client/server system which may be used by an exemplary web-enabled/networked embodiment of the present invention.

A communication system 1200 includes a multiplicity of clients with a sampling of clients denoted as a client 1202 and a client 1204, a multiplicity of local networks with a sampling of networks denoted as a local network 1206 and a local network 1208, a global network 1210 and a multiplicity of servers with a sampling of servers denoted as a server 1212 and a server 1214.

Client 1202 may communicate bi-directionally with local network 1206 via a communication channel 1216. Client 1204 may communicate bi-directionally with local network 1208 via a communication channel 1218. Local network 1206 may communicate bi-directionally with global network 1210 via a communication channel 1220. Local network 1208 may communicate bi-directionally with global network 1210 via a communication channel 1222. Global network 1210 may communicate bi-directionally with server 1212 and server 1214 via a communication channel 1224. Server 1212 and server 1214 may communicate bi-directionally with each other via communication channel 1224. Furthermore, clients 1202, 1204, local networks 1206, 1208, global network 1210 and servers 1212, 1214 may each communicate bi-directionally with each other.

In one embodiment, global network 1210 may operate as the Internet. It will be understood by those skilled in the art that communication system 1200 may take many different forms. Non-limiting examples of forms for communication system 1200 include local area networks (LANs), wide area networks (WANs), wired telephone networks, wireless networks, or any other network supporting data communication between respective entities.

Clients 1202 and 1204 may take many different forms. Non-limiting examples of clients 1202 and 1204 include personal computers, personal digital assistants (PDAs), cellular phones and smartphones.

Client 1202 includes a CPU 1226, a pointing device 1228, a keyboard 1230, a microphone 1232, a printer 1234, a memory 1236, a mass memory storage 1238, a GUI 1240, a video camera 1242, an input/output interface 1244 and a network interface 1246.

CPU 1226, pointing device 1228, keyboard 1230, microphone 1232, printer 1234, memory 1236, mass memory storage 1238, GUI 1240, video camera 1242, input/output interface 1244 and network interface 1246 may communicate in a unidirectional manner or a bi-directional manner with each other via a communication channel 1248. Communication channel 1248 may be configured as a single communication channel or a multiplicity of communication channels.

CPU 1226 may be comprised of a single processor or multiple processors. CPU 1226 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 1236 is used typically to transfer data and instructions to CPU 1226 in a bi-directional manner. Memory 1236, as discussed previously, may include any suitable computer-readable media, intended for data storage, such as those described above excluding any wired or wireless transmissions unless specifically noted. Mass memory storage 1238 may also be coupled bi-directionally to CPU 1226 and provides additional data storage capacity and may include any of the computer-readable media described above. Mass memory storage 1238 may be used to store programs, data and the like and is typically a secondary storage medium such as a hard disk. It will be appreciated that the information retained within mass memory storage 1238, may, in appropriate cases, be incorporated in standard fashion as part of memory 1236 as virtual memory.

CPU 1226 may be coupled to GUI 1240. GUI 1240 enables a user to view the operation of computer operating system and software. CPU 1226 may be coupled to pointing device 1228. Non-limiting examples of pointing device 1228 include computer mouse, trackball and touchpad. Pointing device 1228 enables a user with the capability to maneuver a computer cursor about the viewing area of GUI 1240 and select areas or features in the viewing area of GUI 1240. CPU 1226 may be coupled to keyboard 1230. Keyboard 1230 enables a user with the capability to input alphanumeric textual information to CPU 1226. CPU 1226 may be coupled to microphone 1232. Microphone 1232 enables audio produced by a user to be recorded, processed and communicated by CPU 1226. CPU 1226 may be connected to printer 1234. Printer 1234 enables a user with the capability to print information to a sheet of paper. CPU 1226 may be connected to video camera 1242. Video camera 1242 enables video produced or captured by user to be recorded, processed and communicated by CPU 1226.

CPU 1226 may also be coupled to input/output interface 1244 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 1226 optionally may be coupled to network interface 1246 which enables communication with an external device such as a database or a computer or telecommunications or internet network using an external connection shown generally as communication channel 1216, which may be implemented as a hardwired or wireless communications link using suitable conventional technologies. With such a connection, CPU 1226 might receive information from the network, or might output information to a network in the course of performing the method steps described in the teachings of the present invention.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC § 112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112 (6). In some embodiments, the methods and/or system components which may be located and/or performed remotely include, without limitation: It is noted that according to USA law, all claims must be set forth as a coherent, cooperating set of limitations that work in functional combination to achieve a useful result as a whole. Accordingly, for any claim having functional limitations interpreted under 35 USC § 112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6) is/(are) dependent on one or more remote servers located outside the USA, it is intended that each such recited function under 35 USC § 112 (6) is to be interpreted as the function of the local system receiving the remotely generated information required by a locally implemented claim limitation, wherein the structures and or steps which enable, and breath life into the expression of such functions claimed under 35 USC § 112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC § 112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing machine learning systems according to the present invention will be apparent to those skilled in the art. Various aspects of the invention have been described above by way of illustration, and the specific embodiments disclosed are not intended to limit the invention to the particular forms disclosed. The particular implementation of the machine learning systems may vary depending upon the particular context or application. By way of example, and not limitation, the machine learning systems described in the foregoing were principally directed to point of sale systems implementations; however, similar techniques may instead be applied to automated manufacturing systems and warehouse systems, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

What is claimed is:

1. A method comprising steps of:
scanning, with a scanner system, at least one identification means associated with an object to acquire an object identifier determined from said scanned at least one identification means;
obtaining a classification ID of the object stored in a database based on said object identifier;
capturing, with an imaging device, an image of the object;
communicating said captured image of said object to a training system;
communicating said classification ID to said training system;
training a neural network system with said captured image and first classification ID to produce at least one of, a synaptic weight and a neural weight;
receiving, with a prediction module, said at least one of, a synaptic weight and a neural weight from said training system;
predicting, with said prediction module, a second classification ID of said captured image, said predicting using at least said synaptic weight;
comparing said first classification ID and said second classification ID;
determining an error rate based on said comparing step; and
classifying objects using said prediction module if said error rate is at a predetermined acceptable level.

2. The method as recited in claim 1, further comprising a step of retrieving said classification ID from said database using said identifier obtained from the at least one identification means.

3. The method as recited in claim 1, further comprising a step of accepting a manual entry for said classification ID.

4. The method as recited in claim 1, further comprising a step of storing said synaptic weight for said predicting step if said error rate is at a predetermined acceptable level.

5. The method as recited in claim 4, further comprising a step of determining a classifying ID for an unknown object using at least said stored synaptic weight.

6. The method as recited in claim 4, further comprising steps of capturing an image of an unknown object with a mobile device and predicting, with said prediction module, a classification ID of said captured image, using at least said stored synaptic weight.

7. The method as recited in claim 1, in which said neural network system comprises at least one convolutional layer that is configured to compute a forward pass and a back-propagation pass, and in which said convolutional layer comprises at least a trainable filter and at least one trainable bias per feature map from a plurality of pooled feature maps.

8. The method as recited in claim 7, in which said neural network system further comprises at least one pooling layer that is configured to achieve a spatial invariance by reducing a resolution of said feature map, wherein each pooled feature map from said plurality of pooled feature maps correspond to one feature map of a previous map layer.

9. A non-transitory computer-readable storage medium with an executable program stored thereon, wherein the program instructs one or more processors to perform the following steps:
scanning, with a mobile device, at least one identification means associated with an object to acquire an object identifier determined from said scanned at least one identification means;
obtaining a first classification ID stored in a database based on said object identifier;
capturing an image of the object;
communicating said first classification ID and the captured image to a training system, the training system being configured for at least training a neural network system with said first classification ID and said captured image to produce at least one synaptic weight;
receiving, with a prediction module, said synaptic weight from the training system; and
predicting, with said prediction module, a second classification ID of said captured image, said predicting using at least the synaptic weight;
comparing said first classification ID and said second classification ID;
determining an error rate based on said comparing step;
storing said synaptic weight if said error rate is at a predetermined acceptable level; and
classifying objects using said prediction module based on said stored synaptic weight.

10. The non-transitory computer-readable storage medium of claim 9, wherein the program further comprises a step of capturing an image of an unknown object with a mobile device.

11. The non-transitory computer-readable storage medium of claim 10, wherein the program further comprises a step of communicating said captured image of an unknown object to said prediction module.

12. The non-transitory computer-readable storage medium of claim 11, wherein the program further comprises a step of predicting, with said prediction module, a classification ID of said captured image of an unknown object, using at least said stored synaptic weight.

13. The non-transitory computer-readable storage medium of claim 9, wherein the program further comprises steps of:
retrieving the first classification ID from said database using said object identifier obtained from the at least one identification means;
accepting a manual entry for the first classification ID; in which said comparing step comprises comparing a predicted identification using said synaptic weight to the object identifier to produce an error rate; and
predicting a classification of a captured image of unknown objects with said prediction module within a point of sale system wherein said captured image identify an item for sale.

* * * * *